United States Patent [19]
Jones

[11] Patent Number: 5,381,065
[45] Date of Patent: Jan. 10, 1995

[54] VEHICLE WINDOW AND LOCK SECUREMENT

[76] Inventor: Thomas Jones, 1422 N. Lockwood, Chicago, Ill. 60651

[21] Appl. No.: 35,662

[22] Filed: Mar. 23, 1993

Related U.S. Application Data

[63] Continuation-in-part of Ser. No. 865,350, Apr. 8, 1992, abandoned.

[51] Int. Cl.⁶ .................. B60R 25/00; G05D 3/10
[52] U.S. Cl. .................. 318/454; 318/103; 318/112; 318/468; 307/116; 180/287; 340/545
[58] Field of Search ............ 318/51, 53, 101, 103, 318/112, 264, 265, 266, 267, 286, 452, 453, 454, 466, 467, 468; 307/10.2, 116; 180/287; 340/540, 541, 542, 545

[56] References Cited
U.S. PATENT DOCUMENTS

| | | | |
|---|---|---|---|
| 3,688,173 | 8/1972 | Ballou | 318/267 |
| 4,733,145 | 3/1988 | Ohashi et al. | 318/54 |
| 4,796,013 | 1/1989 | Yasuda et al. | 340/562 |

Primary Examiner—Bentsu Ro
Attorney, Agent, or Firm—David C. Brezina

[57] ABSTRACT

A control circuit for controlling a vehicle window closing and door locking device, comprises a first circuit having three X-OR gates and one AND gate for determining the vehicle general conditions, a second circuit having AND gates and power transistors for determining the vehicle specific conditions, for energizing the individual window motors, and for activating the door lock solenoid. The windows will be closed and the doors will be locked if three conditions are met: (1) no one is seated inside the vehicle, (2) all doors are closed, and (3) the ignition key is not in the ignition.

10 Claims, 3 Drawing Sheets

VEHICLE WINDOW AND LOCK SECUREMENT

DESCRIPTION OF RELATED APPLICATION

This application is a continuation in part application from my application Ser. No. 07/865,350 filed Apr. 8, 1992, now abandoned.

BACKGROUND OF THE INVENTION

The invention is designed to automatically close any opened car windows and to lock the car doors when everyone has exited the car. Three conditions must be met in order for the system to be automatically actuated, the key must be removed from the ignition, no one can be on the car seats and all the doors must be closed.

DESCRIPTION OF RELATED ART

My invention provides a novel circuit for controlling vehicle windows performing the function of closing the windows and locking the doors in a completely automatic manner, without operator intervention, but only on satisfying the conditions of the seats unoccupied, the key out of the ignition and a window open. The invention will then close all windows and lock all door or openable body panels. The prior art devices combine some of the door lock and window controls, but none do so in the fully automatic way and subject to the conditions provided by the invention. Indeed, the prior art generally merely combines functions in a single manually operated switch or door button, still requiring manual operation rather than being truly automatic.

The Ayers, Jr. U.S. Pat. No. 2,696,981 shows and describes a combined door and window regulating system for motor vehicles wherein the locking of the vehicle doors cooperates with the window control system so that when the operator closes one push button switch and leaves the car and closes the door, all four of the doors automatically lock and all of the windows automatically close.

Abrams U.S. Pat. No. 3,135,545 discloses a vehicle door locking and window operating mechanism wherein operating the key of the door locking system locks all of the doors and at the same time, energizes the window regulator so as to close all the windows. The key operated door locking system is an electrically operated system. Each window includes a window close relay having a self-holding circuit, which when energized, completes a circuit for operating the window regulator to close the window. Circuit means associated therewith completes an energizing circuit for the window close relay when the key to lock the doors is operated.

Mazure U.S. Pat. No. 3,608,241 teaches a window operating device for automobiles. The device includes a first single-pole, single-throw switch mounted on the frame of the car door of the driver's side which forms a circuit closure when the door is opened. The switch is opened when the car doors close. A second single-pole, single-throw switch is connected in series with the first switch and is actuated by the security latch of the door. Second switch closes a circuit through it when the security latch is actuated to lock the car door. When both switches are closed, a relay operated from the battery of the car is actuated through a circuit closure to both switches. This causes the driving motors associated with each window to become energized, thereby closing the windows.

The Andrei-Alexandru et al. U.S. Pat. No. 4,381,625 teaches a combination power window and power door locking device. The locking device includes a motor rotatably mounted in the door and resiliently biased toward an angular stop position. Continued application of external power to the motor after the window pane is in one of its end positions rotates the motor away from the stop position to activate the door locking mechanism.

Andrei-Alexandru et al. U.S. Pat. No. 4,478,004 describes a reversible motor driven window regulator combined with a door lock for a motor vehicle. The device includes a sector gear driven by a reversible motor. The sector gear rotates another gear to pivot a lever to raise and lower the window. The clutch is used to couple and decouple the mechanism to the window.

SUMMARY OF THE INVENTION

A primary object of the invention is to automatically close the windows and lock the doors upon meeting the aforementioned conditions.

Another object of the invention is to provide for improved weather-tight status of a vehicle by automatically closing windows and sun/moon roof when occupied.

Yet another object of the invention is to provide is to provide for improved security for a vehicle by closing windows and locking doors when a vehicle is unoccupied by providing for said automatic closing and locking.

Another object of the invention is to provide for improved convenience in an automatic closing and locking vehicle arrangement by eliminating the need for the driver to remember and operate additional switching, but providing for interlocks to avoid inadvertently locking a key in a vehicle, or locking a vehicle when occupied.

Another object of the invention is to adapt existing window closing, door or openable body panel locking and ignition circuitry with a seat occupancy sensitive switch and a module for retrofitting to provide added convenience, security and weather-tight status.

DETAILED DESCRIPTION OF THE PREFERRED EMBODIMENT

The invention is an electrical device that automatically closes all windows of a vehicle if they are down or part of the way down, and locks all the vehicle door or openable body panels. In the preferred embodiment the device is incorporated in a module 60 which may be plugged into the vehicle door or openable body panel, window, seat and lock control circuits. There are two circuits—a first circuit 100 which contains conditional X-OR GATES and one AND GATE to determine general vehicle conditions, and a second circuit 200 to determine specific window conditions and control individual window motors, as illustrated in FIGS. 1 and 2, respectively.

In the preferred embodiment, only five optional door or openable body panels are shown. The term openable body panel is used to clarify the fact that the invention may be adapted by one of ordinary skill in the art to any applicable number of openable vehicle panels including doors, sun or moon roof, hood, trunk, fuel filler door, tailgate or the like, as is needed for the vehicle, without departing from the present invention.

Figure 1:
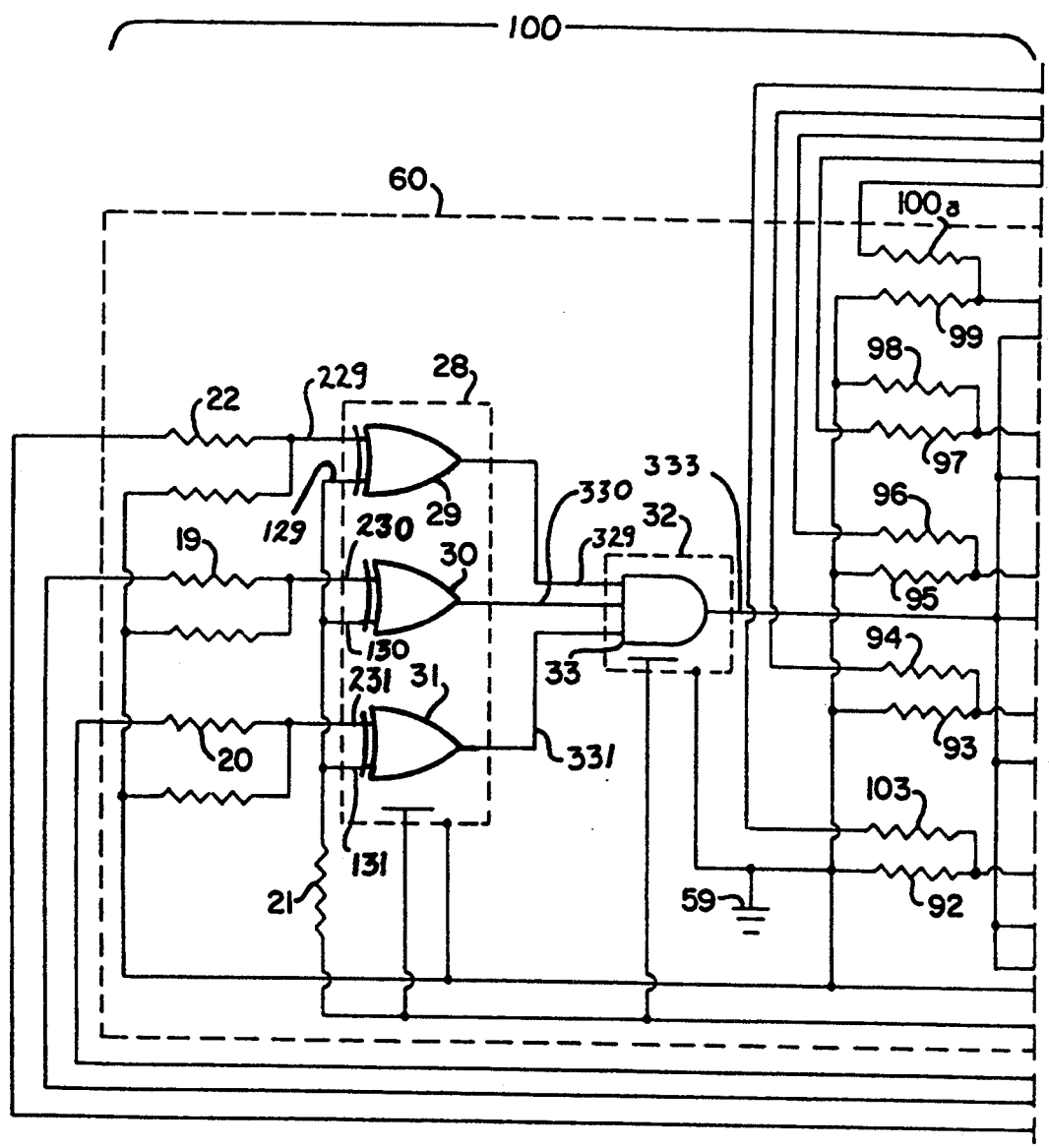
FIG. 1 is the left portion of a three portion schematic showing the invention.
Figure 2:
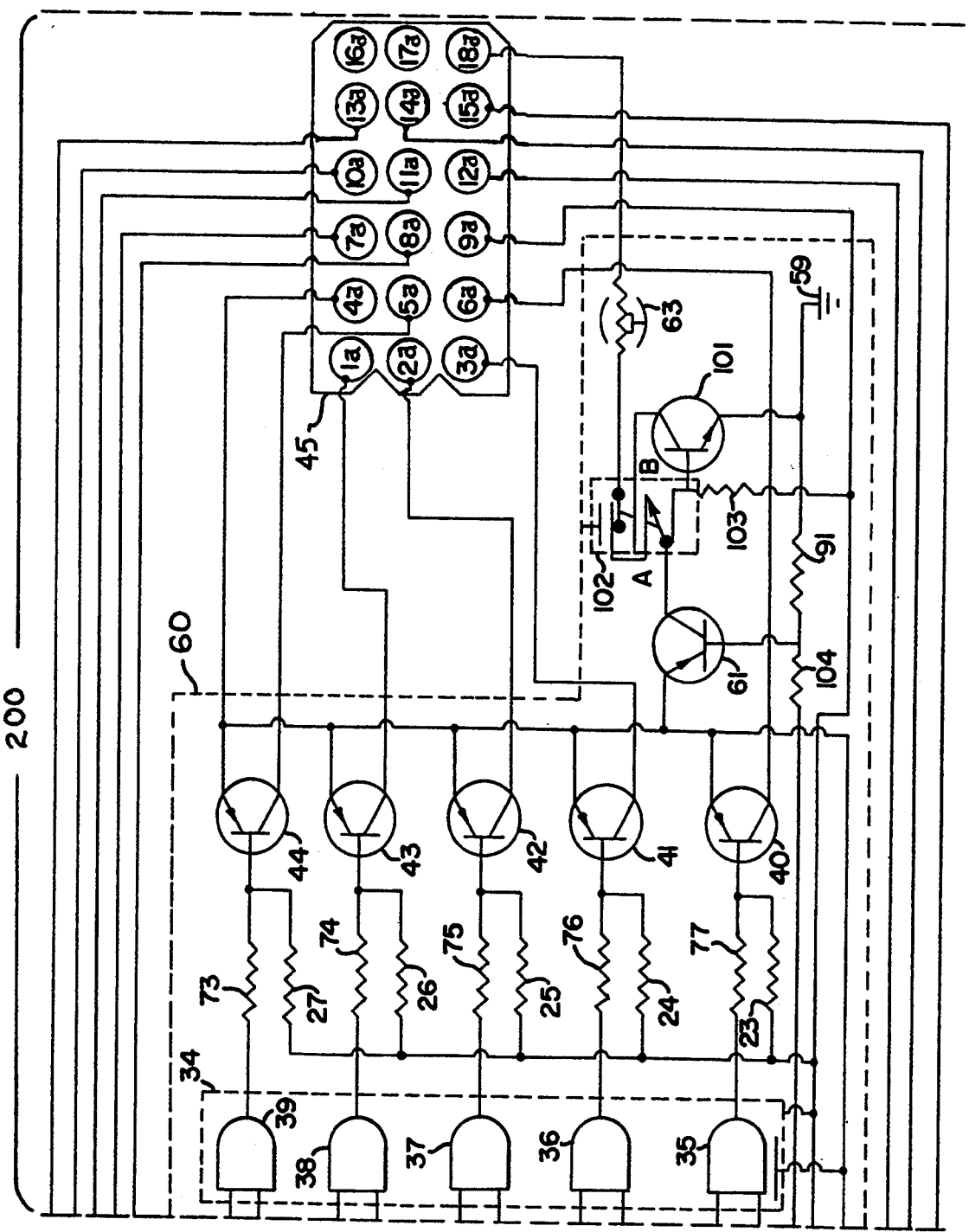
FIG. 2 is the center portion of a three portion schematic showing the invention.

If power switch 62 is closed, voltage from a vehicle battery 53 goes through pins 4a and 4b of male/female socket 45 and 46 as shown in FIGS. 1 and 2. This voltage is the power source for module 60 (FIG. 1), comprising both first 100 and second 200 circuits. Ground is supplied through pins 9a and 9b of the male/female socket 45 and 46.

A combination of events must occur before the device of the invention operates. First, no one can be sitting on the seats. Second, all doors must be closed. Third, the key must be out of the ignition. If one or all of these combinations are active, the associated switches close circuits to apply a positive voltage to the first of the two inputs of an associated one of the respective X-OR GATES 29, 30 and 31.

Figure 3:
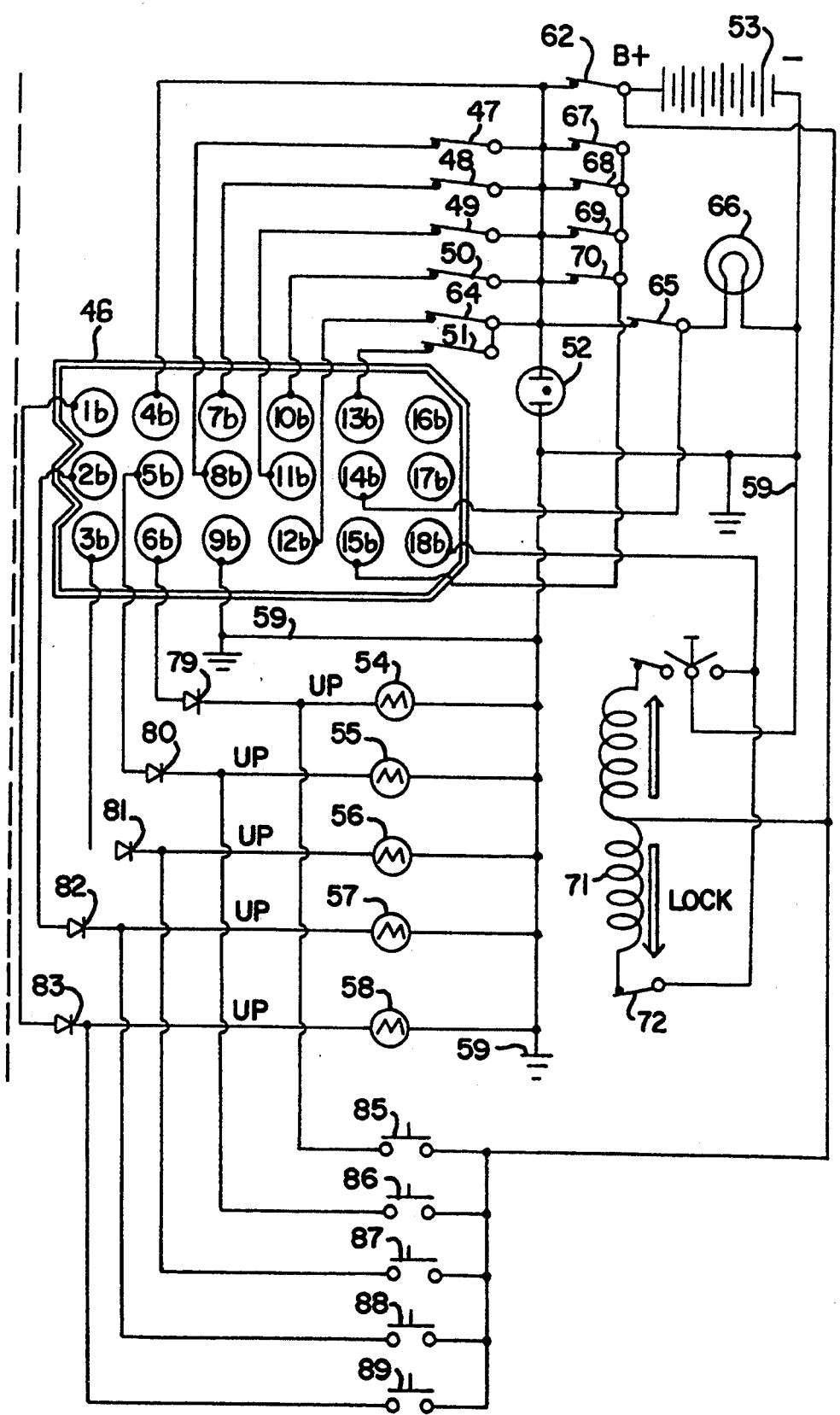
FIG. 3 is the right portion of a three portion schematic showing the invention.

Referring to FIGS. 1 and 3, the X-OR GATES control the device based on three conditions. If someone is sitting on one of the car seats, one of the seat switches 67–70 (FIG. 3) will close, applying positive voltage to terminal 229 of X-OR GATE 29 (FIG. 1) which will prevent the circuit 200 (FIG. 2) from operating. X-OR GATE 30 (FIG. 1) prevents actuation of the circuit when the key is in the ignition, positive voltage to terminal 230 being applied through closed ignition buzz switch 64 (FIG. 3). X-OR GATE 31 (FIG. 1) prevents actuation when a car door or openable body panel is open because light switch 65 (FIG. 3), when closed, applies a positive voltage to terminal 231. In actual application, some vehicles may have a plurality of light switches—one for each door or openable body panel—the closing of any one of which would apply a positive voltage to terminal 231.

X-OR GATE 29 deactivates the device if someone is sitting on seats. X-OR GATE 30 deactivates the device if a door is open. X-OR GATE 31 deactivates the device if the key is in the ignition. The second inputs to the X-OR GATES are connected to the auto battery 53 through pins 4a and 4b of the male/female socket 45 and 46 FIGS. 2 and 3. This voltage is always present at these inputs of the X-OR GATES as long as the on/off switch 62 is closed. As these are X-OR GATES, when there is only one voltage at either of the two inputs, the X-OR GATES will have an output, but positive voltage resulting from any one of these particular conditions failing, when the switch 62 is also closed, will provide positive voltage at both inputs and, therefore, no output.

As shown in the drawings, when the three conditions are met and the power switch 62 is on, voltage from the battery 53 is transmitted through pins 4a and 4b of socket 45, 46 to the module 60 and is grounded through pins 9a and 9b of socket 45, 46. A positive voltage is thereby applied to a first 129, 130 or 131 of the two inputs of the respective X-OR GATES 29, 30 and 31 of first circuit 100 in the module 60 and the module 60 is grounded through pins 9a and 9b of socket 45, 46. Because of the electrical connection so described, the positive voltage is thereby applied to a first 129, 130 or 131 of the two inputs of the X-OR GATES 29, 30, 31 of the module 60, if one or any combination of the operating conditions are met.

A second voltage applied to the second input of the same X-OR GATE deactivates the device, producing no output. This voltage comes from the combinations through pins 12a and 12b, 14a and 14b, and 15a and 15b of the male/female socket 45 and 46. The effect of using these three pairs of inputs is to deactivate the system if either (a) one or more of the seat/door/or key conditions is present, or (b) the power switch 62 is closed. The outputs of these X-OR GATES 29, 30 and 31 are the three inputs to AND GATE 33. AND GATE 33 is a three input GATE which needs three positive voltages input to result in a positive voltage output.

The second 229, 230 or 231 of the two respective inputs to the X-OR GATES are connected through pins 12a and 12b terminal 231 electrically connected to ignition buzz switch 64, 14a and 14b terminal 230 electrically connected to light switch 65, and 15a and 15b (terminal 229 electrically connected to one terminal of each of seat condition switches 67, 68, 69 and 70).

When voltage is applied to any one of the second 229, 230 or 231 of the two respective inputs of each X-OR GATE, the respective X-OR GATE has no output, thereby deactivating the first circuit 100 and deactivating the window control circuit 200 as will be explained. Thus, in the unoccupied, door-closed vehicle with the key out of the ignition, the "normal" condition will be to activate the operative circuit. The operations conclude the description of first circuit 100.

Outputs 329, 330 and 331 of X-OR GATES 29, 30 and 31 are the three positive voltage inputs to AND GATE 33. When all three inputs are positive, AND GATE 33 has its conditions satisfied. The positive output from terminal 333 from AND GATE 33 activates power transistor 61 (FIG. 2) to activate door lock solenoid 71 (FIG. 3) and is a first of the two positive voltage inputs to the respective AND GATES 35–39.

In the preferred embodiment, transistor 101 is electrically connected to switch 102, and resistor 103 in order to tailor the power supply to the circuit to the specific arrangement the solenoid 71 is wired in the automobile. Certain manufacturers wire the solenoid to the B+ terminal of the battery 53, while others connect solenoid 71 to the negative side of the battery 53. Selection of switch 102 between its positions 102 A and 102 B respectively for a vehicle having power supplied by either the negative or B+ battery connection. This provides substantially universal application of the invention as a retro-fit module.

Referring to FIGS. 2 and 3, each AND GATE 35–39 has its respective output electrically connected to respective transistors 40–44 which are power transistors that activate the window motors 54–58. The second input for AND GATES are from the window limit switches 47–51 which will close applying positive voltage to the terminal when any associated window is not closed. As with the openable body panel light switch 65 various vehicles may have a plurality of openable body panel lock solenoids, all of which could be controlled by output 333.

Closed windows engage their respective switches 47, 48, 49 and 50. If fitted to the vehicle, the sun- or "moon" roof has one of these switches, 51. If any window is not completely up, switches 47, 48, 49, 50 and 51 are closed. If any or all of these switches are closed, signifying that a window is not closed, the closed circuit applies a positive voltage at a second of two inputs of AND GATES 35, 36, 37, 38 and 39.

In the preferred embodiment, each window and sun- or moon roof, has its own AND GATE and TRANSISTOR. In vehicles with more or fewer windows, e.g. a station wagon or a two-seat sports car, appropriate numbers of AND GATES and TRANSISTORS can be adapted of ordinary skill, commensurate with this disclosure.

In the preferred embodiment there is one transistor for each window. These are power transistors capable of handling up to 10 amperes. One of ordinary skill could adapt other sizes of transistors in keeping with the current needs of specific motors installed in a vehicle. These power transistors energize the window motors 54, 55, 56, 57 and 58. Each window has its own two input AND GATE and POWER TRANSISTOR.

The positive voltage output of the three X-OR GATES through 33 energizes power transistor 61, the output and current of which is the power to lock openable body panels. Resistor 78 is coupling resistor. It couples voltage from AND GATE 33 to transistor 61 to produce the output to energize openable body panel lock solenoid 71. As discussed, the power connection is selected by switch 102 depending on the vehicle configuration.

Resistors 73, 74, 75, 76, 77 and 78 are coupling resistors, used to isolate the AND GATES from the transistor, coupling the positive terminal to the base of the transistors 40, 41, 42, 43, and 44. Without these resistors 73, 74, 75, 76, 77 and 78, AND GATES 35, 36, 37, 38 and 39 will sometimes load down and will not energize.

Diodes 79, 80, 81, 82, 83 and 84 are isolation diodes used to protect all the GATES on module 60, when manually activated push buttons 85, 86, 87, 88, 89, and 90 are used to operate the windows up and down.

Resistors 94, 96, 97, 100a and 103 have been added in the preferred embodiment to protect gates 35, 36, 37, 38 and 39. The invention will function without resistors 94, 96, 97, 100a and 103, as disclosed in my parent application Ser. No. 07/865,350, but their inclusion is an improvement in the circuit. Resistors 92, 93, 95, 98, and 99 bleed off voltage from the gates to which they are connected faster after switches 47, 48, 49, 50, and 51 are opened, and bleed off static voltage. The invention will function without resistors 92, 93, 95, 98 and 99, as disclosed in my parent application Ser. No. 07/865,350, but their inclusion is an improvement in the circuit.

A connector having male 45 and female 46 components, preferably a multiple pin-style connector known to one of ordinary skill in the art enables the module to be interconnected to the vehicle wiring harness and existing components in a retrofitting application.

Various features of the invention have been particularly shown and described in connection with the illustrated embodiments of the invention, however, it must be understood that these particular arrangements merely illustrate, and that the invention is be given its fullest interpretation within the terms of the appended claims.

In accordance with my invention, I claim:

1. A window closing and openable body panel locking device in a vehicle having a power driven, opening and closing window, a power operated openable body panel lock actuatable between a locked and unlocked position, a seat occupancy sensor for indicating whether a person is seated in the vehicle, an openable body panel ajar sensor for indicating whether an openable body panel is open or closed, a key operated ignition, and an electrical power source, comprising:

a first switch electrically connected to said power source and providing a first predetermined signal when the key is in the ignition;

a second switch electrically connected to said power source and providing a second predetermined signal when the seat is occupied;

a third switch electrically connected to said power source and providing a third predetermined signal when the openable body panel is open;

a first electrical circuit adapted to read said first, second and third signal, and determining if said first, second, and third signals are present or absent, and if said signals are all absent, sending a fourth signal to close said window;

said window having a fourth switch sending a fifth signal when the window is open; said fourth switch being electrically connected to a second circuit adapted to receive said fourth and fifth signals and if both signals are present, to send a sixth signal to energize a motor to close said window;

a first X-OR GATE having a first input electrically connected to said first switch and a second input electrically connected to said power source so that a first output signal is produced when said seat is occupied;

a second X-OR GATE having a first input electrically connected to said second switch and a second input electrically connected to said power source so that a second output signal is produced when said openable body panel is open;

a third X-OR GATE having a first input electrically connected to said third switch and a second input electrically connected to said power source so that a third output signal is produced when key is in said ignition; and an AND GATE having a first AND GATE input for receiving said first output signal, a second AND GATE input for receiving said second output signal and a third AND GATE input for receiving said third output signal, said AND GATE generating said fourth signal when all of said inputs are present.

2. The invention according to claim 1 wherein:

said second circuit being electrically connected to a solenoid for locking the openable body panel in said vehicle, said sixth signal energizing said solenoid.

3. The invention according to claim 2 wherein:

said vehicle having a plurality of windows, each window having a motor electrically connected to said second circuit so that each window, if open, will close when energized by said sixth signal.

4. The invention according to claim 3 wherein:

paid vehicle having a plurality of openable body panels, each openable body panel having a solenoid electrically connected to said second circuit so that each openable body panel, if unlocked, will lock when energized by said sixth signal.

5. The invention according to claim 4 wherein:

said vehicle having manually operated switches electrically connected to each of said motors for manually opening and closing said windows; said device further comprises:

diodes electrically connected to said motors and said manually operated switches to isolate said first and second circuits therefrom when said manually operated switches are closed.

6. An automatic window closing and openable body panel locking device for a vehicle having an occupant seat, an ignition key and openable body panel having a motor driven, electrically controlled window and solenoid operated openable body panel lock, comprising:

means for sensing whether said seat is occupied and generating a first positive voltage if said seat is occupied;

means for sensing whether the key is in the ignition and generating a second positive voltage if said key is in the ignition;

means for sensing whether said openable body panel is ajar and generating a third positive voltage if said openable body panel is ajar;

means for receiving said first positive voltage and generating a fourth positive voltage if the first positive voltage is absent;

means for receiving said second positive voltage and generating a fifth positive voltage if the second positive voltage is absent;

means for receiving said third positive voltage and generating a sixth positive voltage if the third positive voltage is absent;

means for receiving said fourth, fifth and sixth positive voltages and generating a controlling output when all of said fourth, fifth and sixth positive voltages are present;

means for energizing the window motor responsive to said controlling output, means for simultaneously energizing said solenoid operated lock;

said means for receiving said first voltage comprising an X-OR GATE having a first and a second input, the first input being a common input and the second input being electrically connected to receive said first voltage;

said means for receiving said second voltage comprising an X-OR GATE having a first and a second input, the first input being a common input and the second input being electrically connected to receive said second voltage; and said means for receiving said third voltage comprising an X-OR GATE having a first and a second input, the first input being a common input and the second input being electrically connected to receive said third voltage.

7. The invention according to claim 6 wherein:

said means for receiving said fourth, fifth an sixth positive voltages comprising a first AND GATE for producing said controlling output.

8. The invention according to claim 7 wherein:

said means for energizing said window motor responsive to said controlling output further comprising a circuit having a second AND GATE associated with the vehicle openable body panel;

said second AND GATE being electrically connected to a first transistor to energize said window motor when, said window is open and said first AND GATE produces said controlling output;

said second AND GATE being electrically connected to a second power transistor to energize said door solenoid when said first AND GATE produces said controlling output; and said window motor having a manually operated switch electrically connected to the motor, and isolated from said circuit by a diode.

9. An automatic device for a vehicle having a seat, a key ignition and an openable body panel with a window driven by a motor for closing said window and a solenoid for locking said openable body panel, comprising:

an electrical circuit having first, second and third logical elements;

said first logical element being electrically connected to a sensor associated with one of said openable body panel, said seat or said ignition and producing a first output depending on the condition of said openable body panel, said seat or said ignition;

said second logical element being electrically connected to a sensor associated with a second one of said openable body panel, said seat or said ignition and producing a second output depending on the condition of said second one of said openable body panel, seat or ignition;

said third logical element being electrically connected to a sensor associated with the remaining one of said openable body panel, said seat or said ignition and producing a third output depending on the condition of said remaining one of said openable body panel, seat or ignition;

a fourth logical element receiving said three conditional outputs and sending a fourth output when the conditions of the seat unoccupied, the key out of the ignition and the openable body panel closed are met;

said fourth output controls a second circuit which closes said window when said conditions are met, and said second circuit locking said openable body panel;

said first, second and third logical elements comprises X-OR GATES each having one common input and another input connected to receive a positive voltage generated by the respective sensor with which the respective X-OR GATE is associated;

said sensors include a door light switch, a seat occupancy switch and an ignition key buzzer switch; and said positive voltage is supplied by the respective switch.

10. The invention according to claim 9 wherein:

said window being operable manually by a window switch in said vehicle; and said second circuit being electrically isolated from said motor and said window switch by a diode.

* * * * *